United States Patent
Hsieh et al.

(10) Patent No.: US 10,632,569 B2
(45) Date of Patent: Apr. 28, 2020

(54) LASER CUTTING METHOD, DISPLAY SUBSTRATE AND DISPLAY DEVICE

(71) Applicant: BOE TECHNOLOGY GROUP CO., LTD., Beijing (CN)

(72) Inventors: Mingche Hsieh, Beijing (CN); Chunyan Xie, Beijing (CN); Lu Liu, Beijing (CN); Hejin Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1007 days.

(21) Appl. No.: 14/906,373

(22) PCT Filed: May 18, 2015

(86) PCT No.: PCT/CN2015/079164
§ 371 (c)(1),
(2) Date: Jan. 20, 2016

(87) PCT Pub. No.: WO2016/101514
PCT Pub. Date: Jun. 30, 2016

(65) Prior Publication Data
US 2016/0368101 A1    Dec. 22, 2016

(30) Foreign Application Priority Data
Dec. 25, 2014    (CN) .......................... 2014 1 0822275

(51) Int. Cl.
*B23K 26/402*    (2014.01)
*B23K 26/38*    (2014.01)
(Continued)

(52) U.S. Cl.
CPC .......... *B23K 26/402* (2013.01); *B23K 26/009* (2013.01); *B23K 26/38* (2013.01);
(Continued)

(58) Field of Classification Search
CPC .................................................. B23K 26/402
See application file for complete search history.

(56) References Cited

U.S. PATENT DOCUMENTS

2004/0114089 A1    6/2004    Do
2009/0103010 A1*   4/2009    Okamoto .......... G02F 1/133305
                                                                349/73

FOREIGN PATENT DOCUMENTS

CN    101097360 A    1/2008
CN    101276083 A    10/2008
(Continued)

OTHER PUBLICATIONS

Written Opinion of the International Searching Authority dated Oct. 8, 2015 corresponding to International application No. PCT/CN2015/079164.
(Continued)

*Primary Examiner* — Larry W Thrower
(74) *Attorney, Agent, or Firm* — Nath, Goldberg & Meyer; Joshua B. Goldberg; Stephanie Majkut

(57) ABSTRACT

The present invention provides a laser cutting method, a display substrate and a display device. In the laser cutting method, the display substrate and the display device, as a cutting line is defined by two width defining dams on both sides of a region to be cut, the width of the cutting line can be adjusted by adjusting the distance between the two width defining dams. Thus, the width of the laser cutting line is controlled, and the effective use area of the substrate may be saved (and the material may be saved). Meanwhile, as the width defining dams are made of a laser reflective material, a laser beam irradiated onto the width defining dams is reflected without being absorbed by the width defining dams and thus transmitted to a corresponding region on the substrate. As a result, the generation of a carbonization region is avoided.

11 Claims, 3 Drawing Sheets

(51) Int. Cl.
  *B23K 26/00* (2014.01)
  *B23K 26/70* (2014.01)
  *B29C 35/08* (2006.01)
  *B23K 103/00* (2006.01)
  *B29L 11/00* (2006.01)

(52) U.S. Cl.
  CPC ........ *B23K 26/702* (2015.10); *B29C 35/0805* (2013.01); *B23K 2103/42* (2018.08); *B23K 2103/50* (2018.08); *B29C 2035/0838* (2013.01); *B29C 2791/009* (2013.01); *B29C 2793/0027* (2013.01); *B29L 2011/00* (2013.01)

(56) References Cited

FOREIGN PATENT DOCUMENTS

| | | |
|---|---|---|
| CN | 101414073 A | 4/2009 |
| CN | 101645403 A | 2/2010 |
| CN | 101844275 A | 9/2010 |
| CN | 102531371 A | 7/2012 |
| CN | 102986006 A | 3/2013 |
| CN | 103207480 A | 7/2013 |
| CN | 103964683 A | 8/2014 |
| CN | 104439720 A | 3/2015 |
| JP | 2009300475 A | 12/2009 |
| JP | 4932372 B2 | 5/2012 |

OTHER PUBLICATIONS

International Search Report dated Oct. 8, 2015 corresponding to International application No. PCT/CN2015/079164.
The First Office Action dated Sep. 6, 2015 corresponding to Chinese application No. 201410822275.3.

\* cited by examiner

LASER CUTTING METHOD, DISPLAY SUBSTRATE AND DISPLAY DEVICE

This is a National Phase Application filed under 35 U.S.C. 371 as a national stage of PCT/CN2015/079164 filed on May 18, 2015, an application claiming the benefit of Chinese Application No. 201410822275.3 filed on Dec. 25, 2014, the content of each of which is hereby incorporated by reference in its entirety.

FIELD OF THE INVENTION

The present invention relates to the field of display technology, and in particular to a laser cutting method, a display substrate and a display device.

BACKGROUND OF THE INVENTION

At present, the main technology for cutting a display substrate is such a technology that uses a cutter wheel as a tool to cut a glass substrate. In this technology, the surface of the glass substrate is cut by the cutter wheel to form cracks and then an external force is applied to the glass substrate so that the glass substrate is broken along the cracks.

However, this technology is not suitable for substrates made of a flexible material (plastic), for which a laser cutting method is generally used instead.

Generally, only substrates made of a flexible material and having high laser absorptivity can be cut by a laser.

As shown in FIG. 1, when the substrate 1 to be cut is subjected to laser cutting, a laser performs cutting along a cutting line 2. As the material of the substrate 1 has high laser absorptivity, a region on both sides of the cutting line 2 is apt to absorb heat and thus be carbonized to form a carbonization region 3 (regions between both sides of the cutting line 2 and dotted lines in FIG. 1). The carbonization region 3 is a black region, which affects the appearance of the display substrate. Meanwhile, as the carbonization region 3 is too wide relative to the cutting line 2 (generally has a width several times as large as that of the cutting line 2), the area (material) of the substrate 1 is wasted. Additionally, the dust generated when breaking the carbonization region 3 will influence the subsequent process treatment on the substrate 1.

As is well known, the area of the substrate 1 may be utilized more effectively by reducing the width of the cutting line 2, and the waste of material may be thus avoided.

There is a method in the prior art for reducing the width of the cutting line 2 by narrowing the focus point of laser beam. However, narrowing the focus point of laser beam increases the laser energy per unit area, and as a result, the carbonized level of the carbonization region 3 is more significant, and even reaches the extent of coking.

Hence, there is an urgent need to develop a method capable of reducing the width of the cutting line 2 while avoiding the generation of the carbonization region 3.

SUMMARY OF THE INVENTION

Technical solutions employed to solve the aforementioned problems are a laser cutting method, a display substrate and a display device, capable of reducing the width of a cutting line while avoiding the formation of a carbonization region.

The present invention provides a laser cutting method, including steps of:

forming two width defining dams on both sides of a region to be cut on a substrate to be cut;

forming a cutting line between the two width defining dams; and cutting the substrate to be cut along the cutting line by a laser;

wherein the two width defining dams are both made of a light reflective material.

Preferably, the sum of light absorptivity and light transmissivity of the light reflective material is less than or equal to 10%.

Preferably, the light absorptivity of the substrate to be cut is greater than or equal to 80%.

Preferably, the distance between the two width defining dams is in the range of 1 μm to 5 μm.

Preferably, the two width defining dams are made of a light reflective metal material.

Preferably, the light reflective metal material includes any one or more of gold, silver, aluminum, copper and nickel.

Preferably, the size, in a direction perpendicular to a surface having the two width defining dams thereon on the substrate to be cut, of each of the two width defining dams is in the range of 500 angstroms to 2000 angstroms.

Preferably, the size, in a direction parallel to a surface having the two width defining dams thereon on the substrate to be cut, of each of the two width defining dams is in the range of 2 μm to 10 μm.

Preferably, the two width defining dams are both formed by a patterning process.

Preferably, the substrate to be cut is made from an organic material.

Preferably, the organic material is any one of polyethylene terephthalate, polyethylene naphthalate, polycarbonate, polyether sulfone and polyimide.

Another object of the present invention is to provide a display substrate which is prepared by using the above laser cutting method.

Still another object of the present invention is to provide a display device which includes the above display substrate.

In the laser cutting method, the display substrate and the display device provided by the present invention, as the cutting line is defined by two width defining dams on both sides of a region to be cut, the width of the cutting line can be adjusted by adjusting the distance between the two width defining dams. Thus, the width of the laser cutting line is controlled, and the effective use area of the substrate may be saved (and the material may be saved as well).

Meanwhile, as the width defining dams are both made of a light reflective material, a laser beam irradiated onto the width defining dams is, when the substrate is cut by the laser, reflected without being absorbed by the width defining dams and thus transmitted to a corresponding region on the substrate. As a result, the generation of a carbonization region is avoided.

REFERENCE NUMERALS

1: substrate
2: cutting line
3: carbonization region
4: width defining dam

DETAILED DESCRIPTION OF THE EMBODIMENTS

In order to make those skilled in the art understand the technical solutions of the present invention better, the present invention will be further described below in detail with reference to the accompanying drawings and specific embodiments.

Embodiment 1

Figure 1:
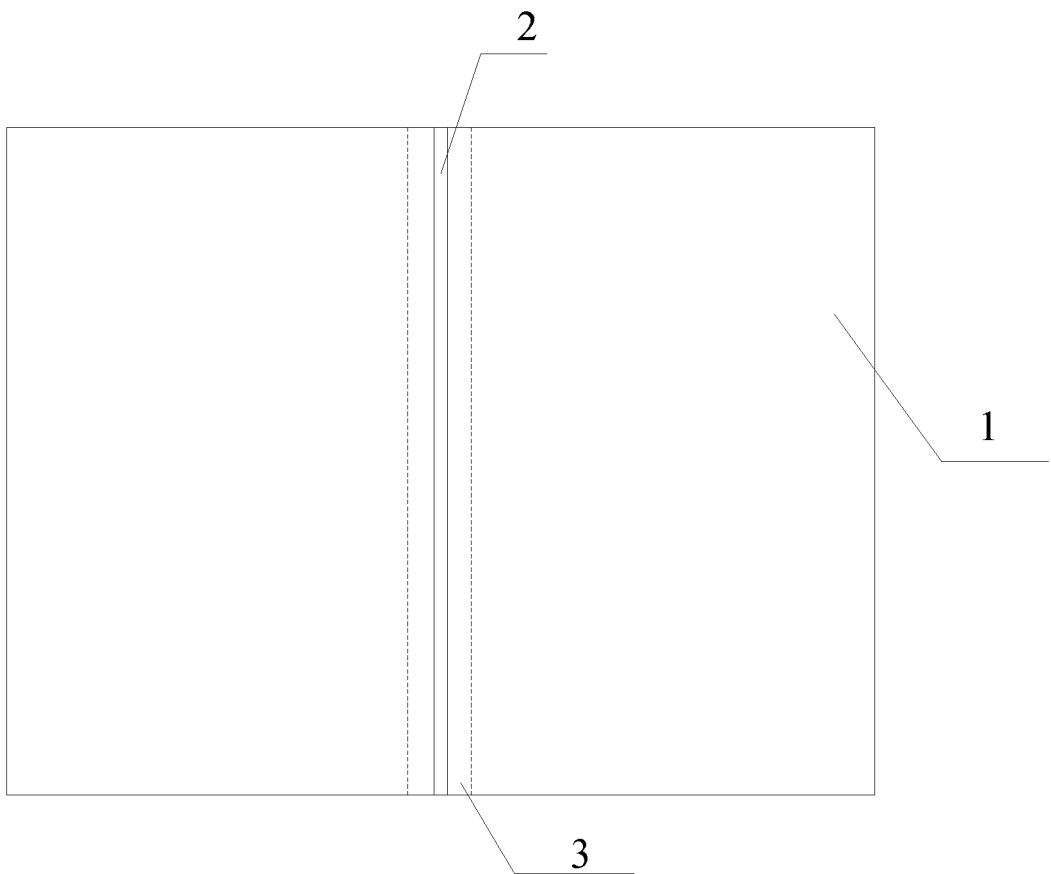
FIG. 1 is a schematic diagram illustrating that a substrate is cut by using an existing laser cutting method.
Figure 2:
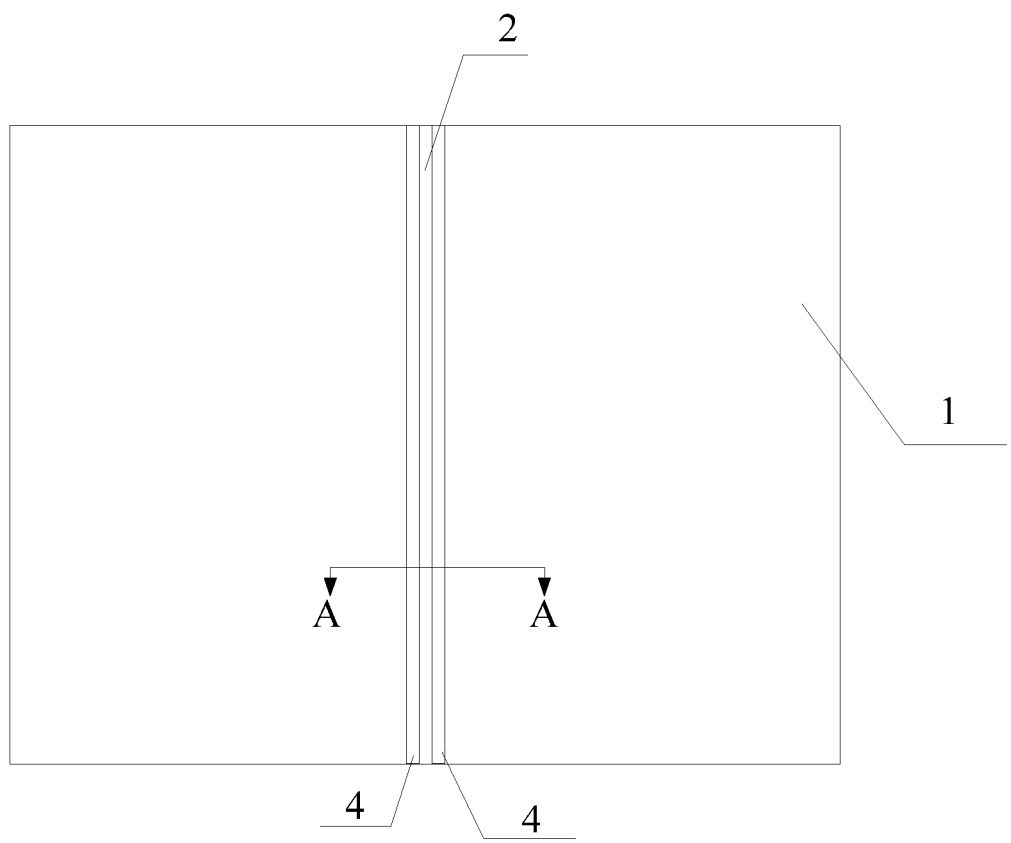
FIG. 2 is a schematic diagram illustrating that a substrate is cut by using a laser cutting method in Embodiment 1 of the present invention.
Figure 3:
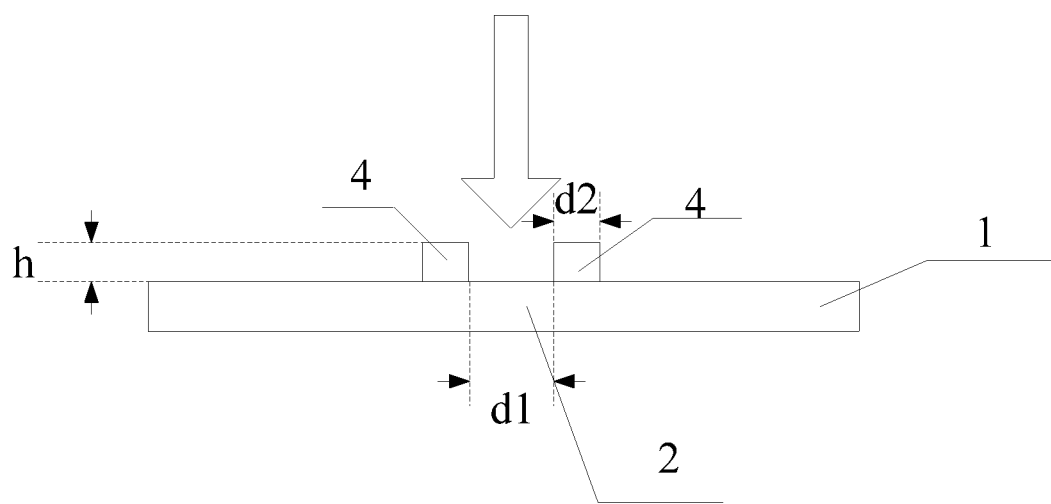
FIG. 3 is a sectional view of the substrate shown in FIG. 2 taken along line A-A.

As shown in FIGS. 2 and 3, this embodiment provides a laser cutting method, including the following steps of:

forming two width defining dams 4 on both sides of a region to be cut on a substrate 1 to be cut;

forming a cutting line 2 between the two width defining dams 4; and cutting the substrate 1 to be cut along the cutting line 2 by a laser;

wherein the two width defining dams 4 are both made of a light reflective material.

In this embodiment, as the cutting line 2 is defined by the two width defining dams 4 on both sides thereof, the width of the cutting line 2 can be adjusted by adjusting the distance between the two width defining dams 4; and thus, the width of the laser cutting line 2 is controlled. In the laser cutting method provided in this embodiment, as the two width defining dams 4 are both made of a light reflective material, the generation of a carbonization region on the substrate 1 to be cut can be avoided. Also, it suffices that the distance between the two width defining dams 4 is equal to the diameter of a laser beam, and the diameter of the laser beam may be smaller than the distance between two carbonization regions generated due to thermal conduction; and additionally, the area on the substrate 1 occupied by the two width defining dams 4 is smaller than that occupied by two carbonization regions generated in the laser cutting method in the prior art. Thus, the effective use area of the substrate 1 may be saved (and the material may be saved).

As described above, as the two width defining dams 4 are both made of a light reflective material, the laser beam irradiated onto the two width defining dams 4 is, when the substrate 1 is cut by using laser light, reflected without being absorbed by the two width defining dams 4 and thus transmitted to a corresponding region on the substrate 1. As a result, the generation of a carbonization region is avoided.

Preferably, the sum of the light absorptivity and light transmissivity of the light reflective material is less than or equal to 10%.

Preferably, the light absorptivity of the substrate 1 to be cut is greater than or equal to 80%.

It should be understood that, the smaller sum of the light absorptivity and light transmissivity of the width defining dam 4, the greater light absorptivity of the substrate 1 to be cut. That is, the larger difference between their light absorptivities for the same light, the better effect of avoiding the generation of a carbonization region.

Preferably, as shown in FIG. 3, the distance d1 between the two width defining dams 4 is in the range of 1 μm to 5 μm. It should be understood that the lower limit of the distance d1 between the two width defining dams 4 depends upon the manufacturing precision of a patterning process, and the distance d1 between the two width defining dams 4 may be further reduced with the utilization of new methods and equipment in the patterning process.

Preferably, the two width defining dams 4 are both made of a light reflective metal material. It should be understood that other materials capable of reflecting light and suitable for forming patterns on the substrate 1 are also applicable.

Preferably, the light reflective metal material includes any one or more of gold, silver, aluminum, copper and nickel. These metal materials are suitable for forming various predetermined patterns by using the patterning process.

Preferably, the size h (or, the height of the width defining dam 4) (as shown in FIG. 3), in a direction perpendicular to a surface having the two width defining dams 4 thereon on the substrate 1 to be cut, of each of the two width defining dams 4 is in the range of 500 angstroms to 2000 angstroms. It should be understood that the above thickness may be adjusted by using the patterning process.

Preferably, the size d2 (or, the width of the width defining dam 4) (as shown in FIG. 3), in a direction parallel to a surface having the two width defining dams 4 thereon on the substrate 1 to be cut, of each of the two width defining dams 4 is in the range of 2 μm to 10 μm. It should be understood that the width d2 may be adjusted according to the width of the used laser beam, the width d2 of the width defining dams 4 may be increased when the width of the used laser beam is large, and the width d2 of the width defining dams 4 may be reduced when the width of the used laser beam is small. The width d2 may be adjusted during the patterning process.

Preferably, the width defining dams 4 are both formed by using the patterning process. It should be understood that the patterning process includes part or all of photoresist coating, exposing with a mask, developing, etching, and photoresist stripping.

Preferably, the substrate 1 to be cut is made from an organic material, and the greater light absorptivity of the organic material, the better.

Preferably, the organic material is any one of polyethylene terephthalate, polyethylene naphthalate, polycarbonate, polyether sulfone and polyimide. The substrate 1 made from the aforementioned material can well absorb the energy of laser.

Embodiment 2

This embodiment provides a display substrate which is prepared by using the above laser cutting method.

Embodiment 3

This embodiment provides a display device which includes the above display substrate.

It should be understood that the aforementioned embodiments are merely exemplary embodiments used for describing the principle of the present invention, but the present invention is not limited thereto. For a person of ordinary skill in the art, various variations and improvements may be made without departing from the spirit and essence of the present invention, and those variations and improvements also fall into the protection scope of the present invention.

The invention claimed is:

1. A laser cutting method, comprising steps of:
    forming two width defining dams that are separated from each other on both sides of a region to be cut on a light incident surface of a substrate to be cut;

forming a cutting line between the two width defining dams; and cutting the substrate to be cut along the cutting line by a laser;

wherein the two width defining dams are both made of a light reflective material.

2. The laser cutting method according to claim 1, wherein the sum of light absorptivity and light transmissivity of the light reflective material is less than or equal to 10%.

3. The laser cutting method according to claim 1, wherein light absorptivity of the substrate to be cut is greater than or equal to 80%.

4. The laser cutting method according to claim 1, wherein a distance between the two width defining dams is in the range of 1 μm to 5 μm.

5. The laser cutting method according to claim 1, wherein the two width defining dams are made of a light reflective metal material.

6. The laser cutting method according to claim 5, wherein the light reflective metal material comprises any one or more of gold, silver, aluminum, copper and nickel.

7. The laser cutting method according to claim 1, wherein a size, in a direction perpendicular to a surface having the two width defining dams thereon on the substrate to be cut, of each of the two width defining dams is in the range of 500 angstroms to 2000 angstroms.

8. The laser cutting method according to claim 1, wherein a size, in a direction parallel to a surface having the two width defining dams thereon on the substrate to be cut, of each of the two width defining dams is in the range of 2 μm to 10 μm.

9. The laser cutting method according to claim 1, wherein the two width defining dams are both formed by a patterning process.

10. The laser cutting method according to claim 1, wherein the substrate to be cut is made from an organic material.

11. The laser cutting method according to claim 10, wherein the organic material is any one of polyethylene terephthalate, polyethylene naphthalate, polycarbonate, polyether sulfone and polyimide.

* * * * *